United States Patent [19]

Dill

[11] 4,176,621
[45] Dec. 4, 1979

[54] PIG CONFINEMENT STALL ASSEMBLY
[75] Inventor: Terry A. Dill, Keota, Iowa
[73] Assignee: The Jefferson Industries Company, Fairfield, Iowa
[21] Appl. No.: 922,594
[22] Filed: Jul. 7, 1978
[51] Int. Cl.² ............................................. A01K 1/02
[52] U.S. Cl. ..................................................... 119/20
[58] Field of Search ....................... 119/15, 17, 20, 27

[56] References Cited

U.S. PATENT DOCUMENTS

| | | | |
|---|---|---|---|
| 232,683 | 9/1880 | Chew | 119/20 |
| 1,462,107 | 7/1923 | Holman | 119/17 X |
| 2,512,094 | 6/1950 | Duncan | 119/27 X |
| 3,418,975 | 12/1968 | Smith | 119/20 |

FOREIGN PATENT DOCUMENTS 231793  1/1961  Australia .................................... 119/20

*Primary Examiner*—Russell R. Kinsey
*Assistant Examiner*—Robert P. Swiatek
*Attorney, Agent, or Firm*—Rudolph L. Lowell; G. Brian Pingel

[57] ABSTRACT

An assembly of pig confinement stalls that includes a first upstanding rectangularly shaped enclosure portion having an open end, and upstanding middle wall portion dividing the first enclosure portion into first and second stall portions, each of which has an open end, an upstanding V-shaped enclosure portion for each of the first stall portions having an apex end, and an open end connected to the open end of a corresponding first stall portion to form a pair of continuous pig retaining enclosures, and a second rectangularly shaped upstanding enclosure portion that has an open end connected to the apices of the V-shaped enclosure portions to form a third continuous pig retaining enclosure.

3 Claims, 3 Drawing Figures

PIG CONFINEMENT STALL ASSEMBLY

BACKGROUND OF THE INVENTION

1. Field of the Invention

The present invention relates in general to confinement stalls for pigs and more specifically to such stalls that can be secured together to form an assembly of stalls.

2. Description of the Prior Art

Various types of pig confinement stalls have previously been employed primarily for the purpose of confining pregnant sows during farrowing. It has been recognized in the art that the use of rectangular stalls for sows may not in all cases provide the most efficient use of floor space in a building as indicated by U.S. Pat. No. 3,418,975 issued to Smith. The Smith patent discloses a five foot square pig pen that includes a stall extended between two opposite corners to provide a stall over seven feet long and has V-shaped opposite ends. However, the advantages of the configuration of the Smith pen only exist for pig farrowing use and a need exists for a space efficient stall assembly for confining pigs in order to limit their physical activity during other periods such as gestation to thereby reduce the occurrence of abortions.

SUMMARY OF THE INVENTION

The present invention provides an assembly of pig confinement stalls that are principally rectangular in shape but include upright V-shaped front enclosure portions. The stalls are arranged in a front end-to-front-end relation to form a pair of adjacent rows of stalls arranged in a side-by-side relation with the V-shaped front portion of each of the stalls in one row formed by and between the V-shaped front portions formed as part of the stalls in the second row. By such arrangement of the stall portions, the overall length of the assembly is significantly decreased to maximize space efficiency in a confinement building.

The V-shaped front stall portions in the second row are formed of upright panel members that are connectable by hinge members to the side walls of the rectangularly shaped stall portions of both rows to form a unitary stall assembly. Accordingly, the rectangularly shaped stall portions and V-shaped stall portions can be prefabricated at the factory and shipped to on-site locations where they can then be connected together whereby to minimize installation labor and expense.

DESCRIPTION OF THE PREFERRED EMBODIMENT

Figure 1:
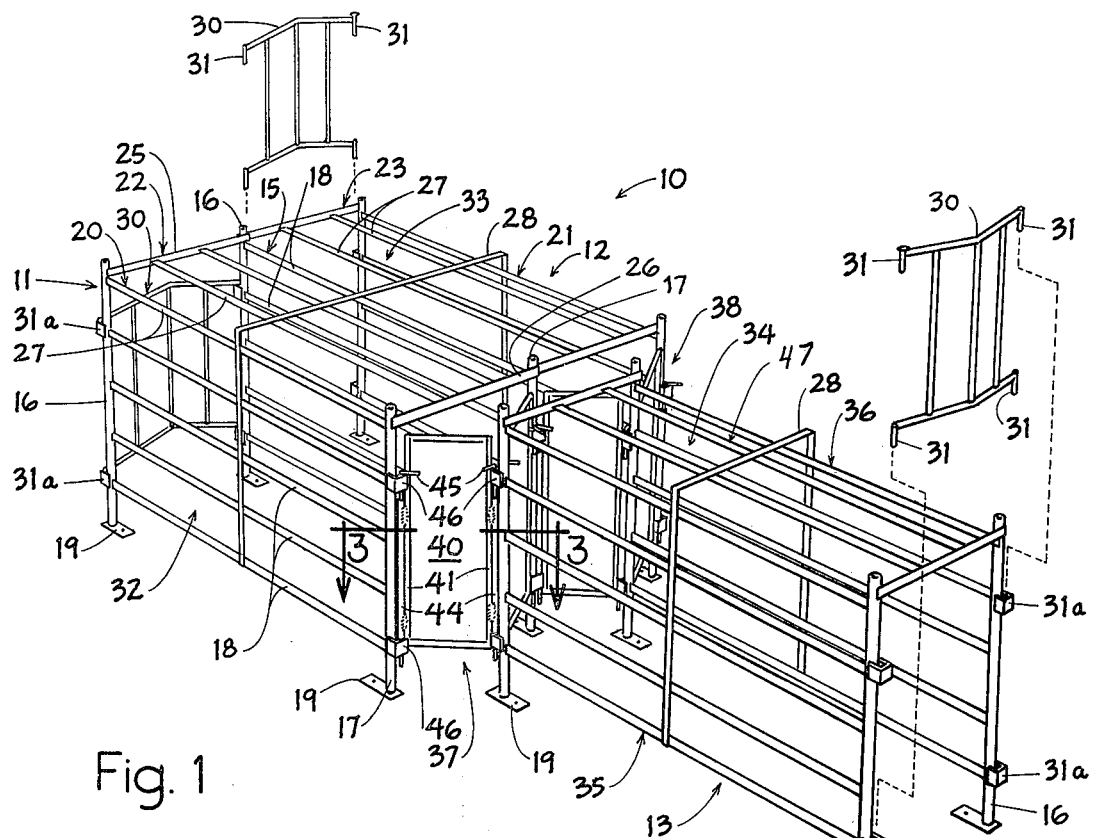
FIG. 1 is a side perspective view of the pig confinement assembly of the present invention.

The present invention provides a unitary stall assembly, shown generally at 10 in FIG. 1, of individual pig confinement stalls 11, 12, and 13, that are particularly adapted for serving as gestation pens for pregnant sows to prevent excess physical activity thereby that can result in abortions.

The stalls 11 and 12 are positioned in a side by side relation in one row of stalls and have a middle portion 15, which serves as a common side or dividing wall between the stalls 11 and 12. The wall portion 15 is approximately five feet long and is formed of rear and front upstanding tubular end posts 16 and 17, respectively, interconnected by five vertically spaced, horizontally disposed, tubular cross rails 18 secured to the posts 16 and 17 as by welding. Mounting feet 19 are provided on the end posts 16 and 17 for attachment to a flooring for the stalls 11 and 12.

Each of the stalls 11 and 12 also has a side wall portion 20 and 21, respectively, that is essentially similar in construction to that of the middle wall portion 15 and includes the upright end posts 16 and 17 and the cross rails 18. The middle wall portion 15 is connected to the side wall portions 20 and 21 by top portions 22 and 23, respectively.

The top portion 22 includes a rear cross rail 25, and a front cross rail 26 connected together by spaced apart top rails 27. The rear cross rail 25 is extended between and bolted to the rear end posts 16 of the stall 11, and similarly, the front cross rail 26 is extended between and bolted to the front end posts 17 of the stall 11 to secure the top portion 22 with the wall portions 15 and 20. In a like manner, the top portion 23 is formed of connecting rails 27 and cross rails 25 and 26 that are respectively extended between and connected to the rear end posts 16 and the front end posts 17 of the stall 12. An inverted U-shaped brace member 28 is welded medially across the top portions 22 and 23 and the side wall portions 20 and 21.

The rear open ends of the stalls 11 and 12 are closeable by removable gates 30 that include corner pins 31 insertable into corresponding brackets 31a welded on the rear end posts 16. Thus, each of the stalls 11 and 12 includes a rectangularly shaped enclosure portion 32 and 33, respectively, each of which has an open front. The side wall portions 15 and 20, top portion 22 and one of the gates 30 forms the enclosure portion 32, and the side wall portions 15 and 21, top portion 23 and the other gate 30 forms the enclosure portion 33.

The stall 13 coacts with the stalls 11 and 12 to form the unit assembly 10. In an overall installation several of the stalls 13 would be arranged in a side-by-side relation to form a second row of stalls, wherein the stalls 13 are in an end-to-end relation with the stalls 11 and 12. The stall 13 has an open end rectangularly shaped enclosure portion 34 that is formed by side portions 35 and 36, a top portion 47 and a gate 30 all similar in structure to the corresponding portions of the stalls 11 and 12. Like elements, therefore, will be indicated by like numbers.

The enclosure portion 34 (FIG. 1) has the open front end thereof adjacent the open front ends of the enclosure portions 32 and 33, but is spaced preferably one foot therefrom to provide the stalls 11, 12 and 13 each with a length of six feet. Also, the enclosure portion 34, is in longitudinal alignment with the middle wall portion 15 of the enclosure portions 32 and 33 so that one of the front end posts 17 of the enclosure portion 34 is equally spaced from the front end posts 17 of the enclosure portion 32, and the other front end post 17 of the portion 34 is equally spaced from the front end posts 17 of the portion 33.

The open front ends of the enclosure portions 32, 33, and 34, are closed by "V" shaped enclosure portions 37 and 38 at the front ends of the stalls 11 and 12, respectively. The portions 37 and 38 are each formed by two upright panel members 39 that interconnect the enclosure portions 32 and 33 with the enclosure portion 34.

The panel members 39 of the enclosure portion 37 are extended between and connected to the end posts 17 of the stall 11 and one of the end posts 17 of the stall 13, while panel members 39 of the enclosure portion 38 are extended between and connected to the end posts 17 of stall 12 and the other end post 17 of the stall 13. Thus, the end posts 17 of the stall 13 are connected to the apices for the enclosure portions 37 and 38.

Figure 3:
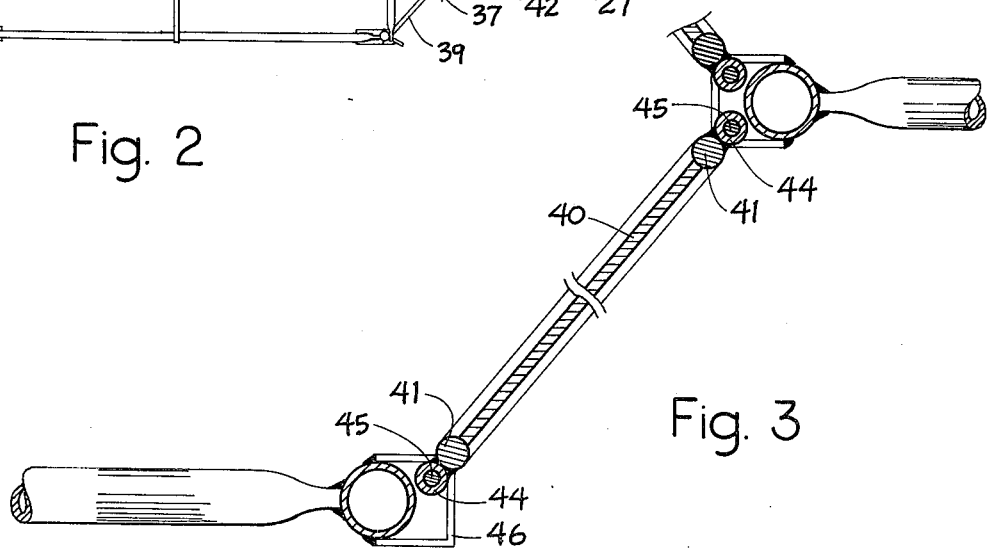
FIG. 3 is an enlarged sectional view taken on line 3—3 of FIG. 1.

Referring to FIGS. 1 and 3, each panel member 39 includes a center plate 40 having brace rods 41 welded on each longitudinal side thereof. Sleeve portions 44 are, in turn, welded to the brace rods 41 and connected by removable pins 45 in a hinged manner with brackets 46 that are welded to the front end posts 17 of the stalls 11, 12 and 13. Thus, not only do the panels 39 form the V-shaped enclosure portions 37 and 38, but also serve to connect the enclosure portion 34 to the enclosure portions 32 and 33 in an assembly relation. Through the use of the hinge connected panel members 39, the enclosure portions 32, 33, and 34 can be prefabricated in a factory and shipped to an on-site location where the assembly 10 can then be readily completed.

Figure 2:
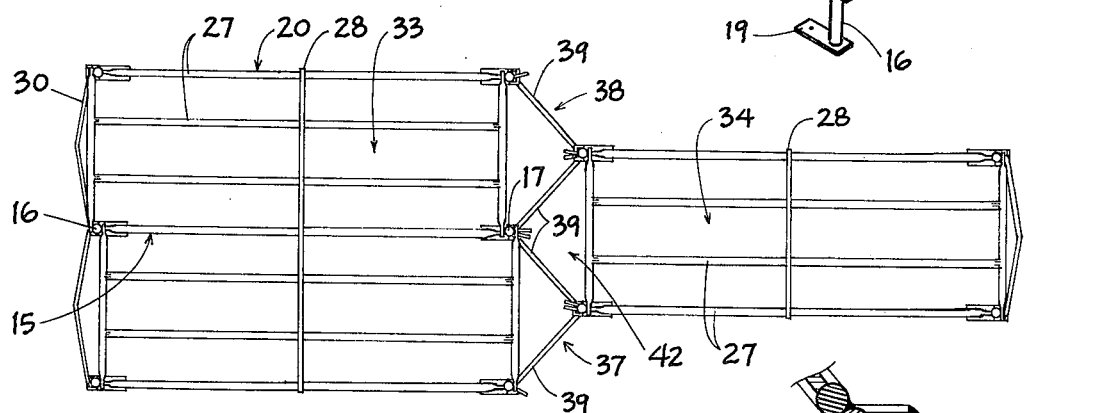
FIG. 2 is a plan view of the assembly of FIG. 1.

As indicated by FIG. 2, the V-shaped enclosure portion 37 closes off the front end of the rectangular enclosure portion 32, and the V-shaped enclosure portion 38 closes off the front end of the rectangular enclosure portion 33 to form the complete animal enclosure stalls 11 and 12. Moreover, due to the on center line placement of the rectangular enclosure portion 34 with respect to the enclosure portions 32 and 33, the adjacent panel members 39 of the V-shaped portions 37 and 38 form a third V-shaped enclosure portion 42 that closes off the open front of the rectangular enclosure portion 34. Thus, the V-shaped enclosure portion 42 is formed by the panel side members of the enclosure portions 37 and 38.

As a result of the interconnection of the stalls 11, 12 and 13 of assembly 10 several advantages are provided. A first advantage is that animal feed can readily be distributed to each of the stalls 11–13 by means of a feed distributor (not shown) having discharge outlets located above the front ends of the stalls 11–13. Such feeding is particularly advantageous when a plurality of assemblies 10 are connected together side by side to form two rows of stalls with intermeshed front end portions. A second advantage of the assembly 10 is that the length of each of the stalls 11–13 is about six feet, but due to the one foot overlap of the front end V-portions, the overall length of the assembly 10 is only eleven feet long. It is apparent that by extending the length of the V-shaped enclosure portions 37 and 38 and decreasing the length of the rectangular enclosure portions 32, 33 and 34, even further reductions in the overall length of the assembly 10 can be achieved if desired.

Although the invention has been described with respect to a preferred embodiment thereof, it is to be understood that it is not to be so limited since changes and modifications can be made therein which are within the full intended scope of this invention as defined by the appended claims.

I claim:
1. An assembly of pig confinement stalls comprising:
 (a) a first upstanding enclosure of a substantially rectangular shape in horizontal cross section and open at one end,
 (b) an upstanding partition wall dividing said enclosure into first and second longitudinally extending stalls each of which has an open end,
 (c) a substantially v-shaped, upstanding enclosure section for each of said first and second stalls, each v-shaped enclosure section having an apex end and an open base, with the base of each section being connected to the open end of a corresponding stall to form a pair of continuous pig-retaining enclosures; and
 (d) a second upstanding enclosure of a substantially rectangular shape in horizontal cross section having one end connected to the apices of said v-shaped upstanding enclosure sections to form a third continuous pig-retaining enclosure.

2. A pig confinement stall assembly according to claim 1 including:
 (a) releasable connections for securing said v-shaped upstanding enclosure sections to said first and second enclosures.

3. A pig confinement stall assembly according to claim 1 including:
 (a) removable gates for the ends of said first and second stalls opposite said open ends.